3,229,749
SPRAY EVAPORATOR FOR REMOVING EXCESS
WATER FROM SEPTIC OR DRAINAGE TANKS
Raymond Willard Holmer, Oak Park, Ill., assignor of one-
half to Glenn Ellsworth Hansen
Filed May 28, 1962, Ser. No. 198,065
3 Claims. (Cl. 159—4)

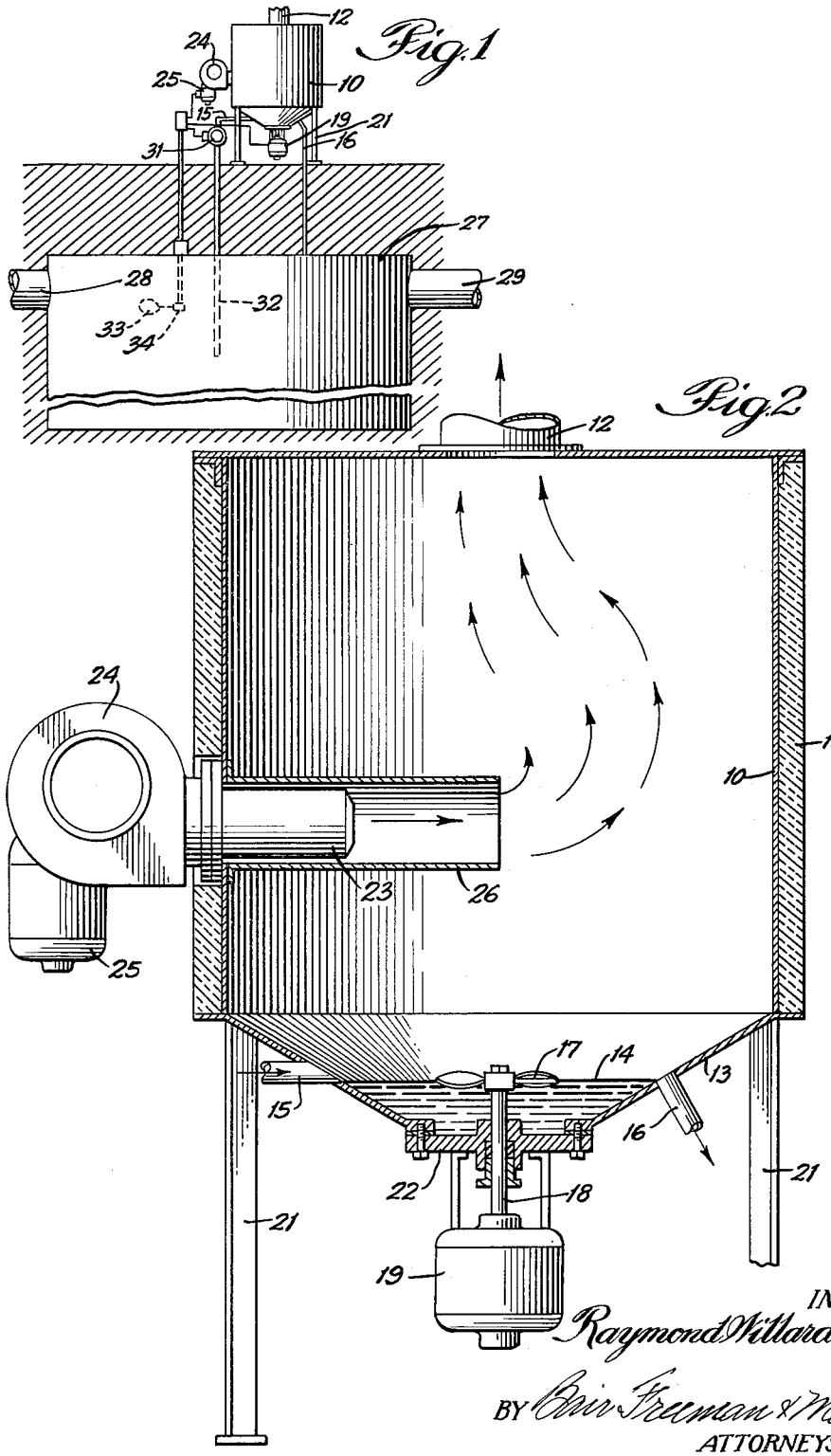

This invention relates to evaporators and more particularly to an evaporator for use with septic tanks to dispose of excess water therefrom.

In the use of septic tanks and particularly in areas having a clay or similar tight soil or where drainage levels are inadequate the problem of disposing of the water becomes a serious one. Flooding of the septic tank or surface seepage frequently results, either of which is an undesirable condition, and interferes with proper functioning of the septic tank.

It is accordingly an object of the present invention to provide an evaporator for use with septic tanks which operates efficiently to dispose of liquid therefrom by evaporation.

Another object is to provide an evaporator in which the liquid is sprayed into a heated chamber to be evaporated rapidly. The vapor may be discharged into the air or may be condensed for irrigation, or similar uses.

Still another object is to provide an evaporator in which the liquid is sprayed into contact with the flame from a burner in a chamber to produce maximum efficiency of operation.

According to a feature of the invention, the burner is shielded to prevent direct contact of the sprayed liquid therewith or with the flame immediately adjacent thereto to prevent freezing of the flame.

The above and other objects and features of the invention will be more readily apparent from the following description when read in connection with the accompanying drawing, in which:

FIG. 1 is a diagrammatic partially sectional view illustrating application of the evaporator to a septic tank; and
FIG. 2 is an enlarged sectional view of the evaporator.

Referring first to FIG. 2, the evaporator comprises a chamber 10 which may be formed of sheet metal or other desired materials and which is preferably covered at least on its sides with a layer 11 of insulating material to minimize heat losses and to prevent burning of anyone accidentally contacting the chamber. The chamber is formed in its top with a vapor outlet opening terminating in a pipe or conduit 12 which may simply be a short vertical stack when the vapor is to be discharged to the atmosphere or which may lead to a condenser when the vapor is to be condensed and reused.

At its bottom the chamber tapers downwardly and inwardly, as indicated at 13, to define a pocket of reduced area compared to the area of the chamber in which liquid may accumulate, as indicated at 14. The liquid to be evaporated may be supplied to the chamber through an inlet conduit 15 opening into the reduced bottom thereof substantially at the desired level of liquid therein. The desired liquid level may be maintained in the bottom of the chamber either by a float controlled inlet valve or by an overflow conduit 16 opening into the bottom portion of the chamber at the desired level to liquid therein.

The liquid collecting in the bottom of the chamber is adapted to be sprayed in the form of a relatively fine spray into and substantially throughout the chamber. For this purpose, as shown, an agitator 17 in the form of a conventional fan blade is mounted for rotation in the lower part of the chamber on a vertical axis and is positioned substantially at the normal level of liquid in the chamber so that the agitator blades will dip slightly into the liquid. The agitator blades are mounted on a vertical shaft 18 extending through suitable seals into the bottom of the chamber and which is driven by an electric motor 19 mounted below the chamber. The chamber may be supported on legs 21 which are of a sufficient length to provide space beneath the chamber for the motor 19 and for reasonable access thereto for repairs. To make repairs easier the motor is preferably supported on a mounting plate 22 detachably secured to the bottom of the chamber and closing and opening therein so that the entire motor and agitator assembly can easily be removed for repair or replacement simply by removing the mounting plate.

According to the present invention, the liquid sprayed into the chamber is evaporated by the application of heat thereto so that the sprayed liquid will evaporate rapidly and efficiently. Preferably the heat is supplied by a burner extending into the chamber so that the sprayed liquid will directly contact the flame and combustion products from the burner. As shown, a conventional oil burner indicated at 23 extends horizontally through an opening in the side of the chamber intermediate its top and bottom. The oil burner may include a blower 24 and operating motor 25 therefor which are positioned outside of the chamber. When the burner is operating, the flame therefrom will be projected into the chamber to contact the sprayed liquid particles directly and to evaporate them rapidly and at maximum efficiency.

In order to prevent the sprayed liquid particles from cooling the burner or flame therefrom too rapidly, the burner is preferably shielded from the spray means. As shown, an elongated tube 26 is positioned around the burner nozzle and projects beyond the end of the burner nozzle into the chamber. This tube not only prevents direct contact of the sprayed liquid with the burner itself, but also prevents the sprayed liquid from cooling the flame before it has a chance to get properly established so that the flame will burn completely and efficiently to utilize all of the heat units available.

In applying the evaporator to a septic tank, an arrangement as shown in FIG. 1 may be employed. As shown in this figure, a conventional septic tank 27 is buried beneath the ground and is provided with an inlet conduit 28 and one or more drain conduits 29 for conducting liquid from the septic tank to the area where it is normally absorbed. The evaporator may be mounted above the ground either directly above the septic tank, as illustrated, or closely adjacent thereto. The inlet conduit 15 of the evaporator is connected to a pump 31 which has an inlet tube 32 extending downwardly into the septic tank to pump liquid therefrom into the evaporator. The overflow conduit 16 may be extended through the upper part of the septic tank to return excess liquid thereto.

Operation of the pump 31, the burner and the agitator motor 19 are preferably controlled automatically in response to the level of liquid in the septic tank. For this purpose, as shown, a float 33 is mounted in the septic tank to operate a switch 34 as the level rises above and falls below the level at which it is desired to have the evaporator operate. The switch 34 is connected in circuit with the burner motor 25, the motor which drives the pump 31 and with the agitator motor 19. In operation, when the level in the septic tank rises to a point sufficient to effect closing of the switch 34 the several motors will be energized simultaneously. At this time, liquid will be pumped from the septic tank into the evaporator and will be sprayed by the agitator 17 into the agitator chamber into direct contact with the flame and combustion products from the burner which is then operating. The liquid will be evaporated and conducted away through the discharge conduit 12 with any excess returning to the septic tank through the overflow conduit 16. When the level in the septic tank is again reduced to the desired point, the float 33 will drop to open the switch 34 and de-energize the several motors. In this way, the evaporator will be controlled to function only when needed and will at all times maintain the level of liquid in the septic tank within the desired limits so that the septic tank will function properly and effectively.

While one embodiment of the invention has been shown and described herein, it will be understood that it is illustrative only and not to be taken as a definition of the scope of the invention, reference being had for this purpose to the appended claims.

What is claimed is:

1. In combination with a septic tank, an evaporator comprising a chamber having an outlet opening at its top for vapor, means for heating the chamber, means to conduct liquid from the septic tank into the chamber, spray means in the chamber to spray the liquid in a relatively fine spray in the chamber whereby the liquid will vaporize rapidly and pass through the outlet opening, means in the chamber to limit the level of unvaporized liquid therein and means responsive to an upper limiting level of liquid in the septic tank to initiate operation of the heating means, the conducting means and the spray means and further responsive to a lower limit of the liquid level in the septic tank to terminate operation of the heating means, the conducting means and the spray means.

2. In combination with a septic tank, an evaporator comprising a chamber having an outlet opening at its top for vapor, a fuel burner extending into the chamber intermediate its top and bottom, the flame produced by the burner burning in the chamber and the products of combustion passing out the outlet opening, means to conduct liquid from the septic tank to the chamber, spray means in the chamber to spray the liquid in direct contact with the flame from the burner to be vaporized and to pass out the outlet opening with the products of combustion and means responsive to an upper limiting level of liquid in the septic tank to initiate operation of the heating means, the conducting means and the spray means and further responsive to a lower limit of the liquid level in the septic tank to terminate operation of the heating means, the conducting means and the spray means.

3. The combination of claim 2 including a shield around the burner to prevent the sprayed liquid from contacting the burner or the flame immediately adjacent thereto.

References Cited by the Examiner

UNITED STATES PATENTS

| | | |
|---|---|---|
| 1,410,358 | 3/1922 | Ball. |
| 1,471,765 | 10/1923 | Wilson _____ 159—4 |
| 1,491,026 | 4/1924 | Brindle _____ 159—4 |
| 1,491,486 | 4/1924 | Marquard et al. _____ 159—4 |
| 1,544,130 | 6/1925 | Christensen _____ 159—4 |
| 1,766,622 | 6/1930 | Frey _____ 159—44 |
| 1,886,163 | 11/1932 | Christensen. |
| 2,327,039 | 8/1943 | Heath _____ 159—4 |
| 2,368,049 | 1/1945 | Stratford _____ 159—4 |
| 2,677,368 | 5/1954 | Janecek _____ 126—350 |
| 2,872,973 | 2/1959 | Nieuwenhuis et al. _____ 159—4 |
| 2,875,749 | 3/1959 | Pettit et al. _____ 126—350 |
| 2,921,681 | 1/1960 | Toulmin _____ 210—71 |

NORMAN YUDKOFF, *Primary Examiner.*

FRED L. MATTESON, JR., *Examiner.*